(12) United States Patent
Moore et al.

(10) Patent No.: US 11,514,282 B1
(45) Date of Patent: Nov. 29, 2022

(54) PAGE PARALLEL PDF FLATTENING

(71) Applicant: Xerox Corporation, Norwalk, CT (US)

(72) Inventors: Lee Coy Moore, Penfield, NY (US); Edward Chapman, Rochester, NY (US)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 17/301,067

(22) Filed: Mar. 24, 2021

(51) Int. Cl.
G06K 15/02 (2006.01)
(52) U.S. Cl.
CPC ....... *G06K 15/1857* (2013.01); *G06K 15/025* (2013.01); *G06K 15/1813* (2013.01); *G06K 15/1836* (2013.01)
(58) Field of Classification Search
CPC .................................................. G06K 15/1857
USPC .................................................. 358/1.15, 1.9
See application file for complete search history.

(56) References Cited

U.S. PATENT DOCUMENTS

| 6,938,051 B1* | 8/2005 | Burger ................ G06Q 20/102 705/40 |
| 7,209,258 B1* | 4/2007 | Markovic ............ G06T 11/203 358/1.18 |
| 10,475,153 B1* | 11/2019 | Bai .......................... G06T 1/20 |
| 2004/0083430 A1* | 4/2004 | Boonen ................ G06F 40/151 715/230 |
| 2004/0197124 A1* | 10/2004 | Klassen ................ G06F 3/1285 400/70 |
| 2013/0188211 A1* | 7/2013 | Matsushita ........ G06K 15/1856 358/1.15 |

\* cited by examiner

Primary Examiner — Jacky X Zheng
(74) Attorney, Agent, or Firm — Fay Sharpe LLP

(57) ABSTRACT

Systems and methods are described that facilitate parallel processing of PDF documents for printing, wherein the PDF documents comprise transparency effects. Transparent objects in the PDF document are identified, and the document is divided into subgroups of pages. The transparency objects are then flattened to enable conversion to PostScript format. The PostScript pages are processed and rendered to raster for printing.

19 Claims, 4 Drawing Sheets

PAGE PARALLEL PDF FLATTENING

TECHNICAL FIELD

The presently disclosed embodiments are directed toward parallel processing document systems. However, it is to be appreciated that the present exemplary embodiments are also amenable to other like applications.

BACKGROUND

Conventional approaches for converting documents from Portable Document Format (PDF) to PostScript spend approximately 20% or more of the total time it takes to perform the print job on the PDF-to-PostScript conversion step. Discovery-based printing devices accept a variety of page description languages (PDLs). Printers can print PostScript and, when presented with PDF, convert the PDF to PostScript, interpret the PostScript, and the render the imaging primitives to page rasters.

Sometimes there are performance bottlenecks in this pipeline. Historically, the rate limiting factor for job completion has been rendering. To speed the rendering step up, some conventional systems have divided up the rendering work and then submit it to separate "worker" threads.

In some customer jobs, the conversion of PDF to PostScript can be slow because some PDF files contain transparency effects, which is something that PostScript does not support natively. Jobs with transparencies often occupy up to 90% or more of total print time.

There is a need in the art for systems and methods that facilitate addressing transparency effects in PDF documents so that PostScript processing can be performed, while overcoming the aforementioned deficiencies.

BRIEF DESCRIPTION

In one aspect, a method for flattening transparent objects during page parallel processing of a PDF document comprises receiving a PDF document, identifying transparent objects in pages of the PDF document, and chunking pages of a received PDF document into subgroups as a function of identified transparent objects on respective pages. The method further comprises converting in parallel each subgroup of PDF pages to PostScript format, converting PostScript pages into imaging primitives, in parallel, and rendering subgroups of imaging primitives to raster.

In another aspect, system that facilitates flattening transparent objects during page parallel processing of a PDF document comprises one or more processors configured to receive a PDF document, identify transparent objects in pages of the PDF document, and chunk pages of a received PDF document into subgroups as a function of identified transparent objects on respective pages. The one or more processors are further configured to convert in parallel each subgroup of PDF pages to PostScript format, convert Postscript pages into imaging primitives, in parallel, and render subgroups of imaging primitives to raster, and print the raster on a printable medium.

In another aspect, one or more processors are configured execute computer-readable instructions for flattening transparent objects during page parallel processing of a PDF document, the one or more processors being configured to receive a PDF document, identify transparent objects in pages of the PDF document, and chunk pages of a received PDF document into subgroups as a function of identified transparent objects on respective pages. The one or more processors are further configured to convert in parallel each subgroup of PDF pages to PostScript format, convert Postscript pages into imaging primitives, in parallel, an render subgroups of imaging primitives to raster.

BRIEF DESCRIPTION OF THE DRAWINGS

The embodiments disclosed herein will be better understood from the following detailed description with reference to the drawings, which are not necessarily drawn to scale and in which.

DETAILED DESCRIPTION

The embodiments of the invention and the various features and advantageous details thereof are explained more fully with reference to the non-limiting embodiments that are illustrated in the accompanying drawings and detailed in the following description.

The foregoing problems are solved by speeding up the wall-clock time of the conversion of PDF to PostScript by parallelizing this process. Since the input PDF is page independent and involves a random access requirement, the conversion of a PDF document can be sub-divided and assigned to multiple, independent, worker threads and/or processes. The resulting PostScript can be re-assembled for further pipeline processing.

Figure 1:
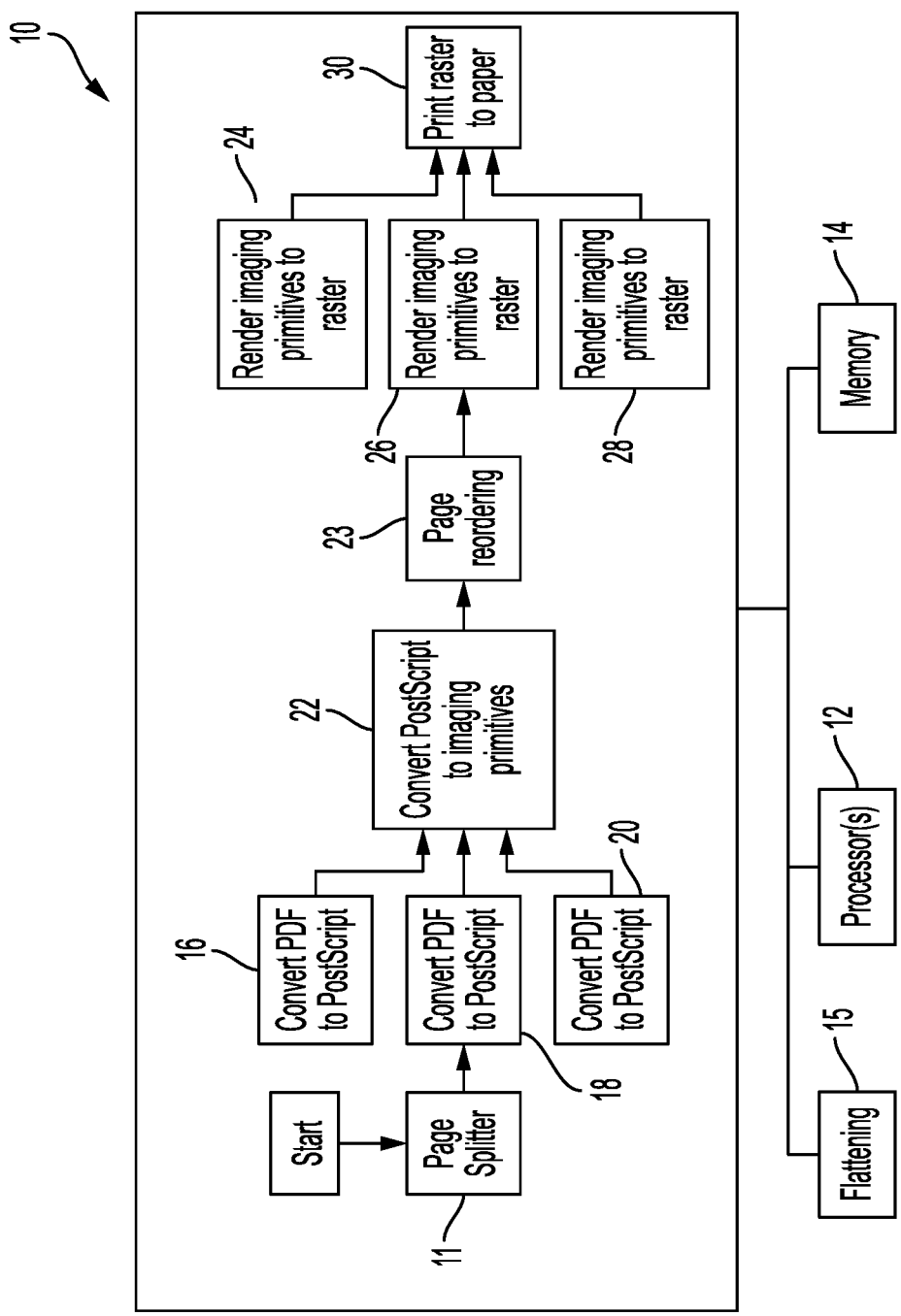
FIG. 1 illustrates a system that facilitates page parallel PDF processing using one or more processors and one or more memories to contemporaneously convert PDF pages to Postscript pages, in accordance with one or more features described herein.

FIG. 1 illustrates a system 10 that facilitates page parallel PDF processing with transparency object flattening using a page splitter 11, one or more processors 12 and one or more memories 14 (e.g., computer-readable media) to contemporaneously convert PDF pages to Postscript pages, in accordance with one or more features described herein. PDF is a static representation of a printable document. Often, PDF documents include transparency effects (i.e., sections or regions of a document or page including objects that can be seen through or are not entirely opaque), which are difficult to convert into PostScript. To this end, the system 10 comprises a flattening module 15 that, when executed by the processor 12, collapses two (or more) overlaid transparent objects into a one or more non-transparent objects that can be processed using PostScript, which places markers on the media, into imaging primitives.

A received PDF document is chunked into groups by the page splitter 11, each group then being separately processed in parallel by a plurality of respective conversion modules 16, 18, 20 which convert the PDF pages in the chunk into Postscript pages while reducing processing time. Chunking can be performed by the processor 12. For instance, a given document can be chunked into N subgroups of pages, where N is an integer, each subgroup comprising a roughly equal number of pages. E.g., a 20 page document chunked into three chunks can comprise subgroups or chunks of 6, 6, and 7 pages, respectively. Alternatively, chunking can be performed in an interleaved manner such that for a 20 page document divided into three subgroups, the first subgroup includes pages 1, 4, 7, 10, 13, 17, and 20, the second subgroup comprises pages 2, 5, 8, 11, 14, and 17, and the third subgroup comprises pages 3, 6, 9, 12, 15, and 18. In some instances, the received PDF document may comprise one or more pages that do not include transparent objects, while other pages do include transparent objects. In another example, the PDF document may not include any transparent objects, in which case the described systems and methods can still parallel process the document without needing to distributed pages to chunks based on whether the pages include transparent objects.

In yet another embodiment, chunking is performed by the page splitter 11 as a function of identified transparent objects in the document. For instance, if pages 4, 5, and 6 include a transparency object, these pages can be assigned to separate subgroups or chunks for processing by separate processors or threads. This feature mitigates backlog by avoiding a situation wherein one processor or thread is required to flatten all transparent objects in the document while other processors or threads are not required to perform flattening.

It will be appreciated that while the flattening module 15 is illustrated as a separate component from the conversion modules 16, 18, 20, the flattening module may alternatively be integral to each conversion module 16, 18, 20, such that each conversion module is responsible for performing the herein-described flattening of transparent objects.

The flattening module 15 converts PDF objects with transparencies to PostScript objects. According to an example, there are two objects, lines A and B, in PDF format, with properties such as color, length, thickness etc. When the two PDF objects are flattened, there are 5 PostScript objects A1, A2, B1, B2, and an intersection AB with properties. To further this example, three intersecting PDF objects become 12 PostScript objects when flattened. Once flattening is complete, the PDF pages can be converted to PostScript for image primitive generation.

In one embodiment, the processor 12 is further configured to identify pages with transparency objects and to generate batches or chunks of PDF pages that comprise an evenly distributed number of transparency objects. In another embodiment, document chunks that include a higher number of transparency objects relative to other chunks are routed to higher performance processors or threads for PostScript conversion.

A primitives conversion module 22 receives the converted PostScript-formatted pages from the respective conversion modules 16, 18, 20, and converts the received PostScript pages to imaging primitives. A page reordering module 23 reorders the pages into their original sequence, and then again chunks the document into subgroups of pages of imaging primitives for parallel processing by rendering modules 24, 26, 28. The imaging primitives are received at a plurality of rendering modules 24, 26, 28, which render the imaging primitives to raster. Imaging primitives are lower-level commands that are executed and/or displayed in list order. In one embodiment, the imaging primitives a presented as a display list. Rendering to raster thus comprises executing the imaging primitives in list order. Once the imaging primitives have been rendered to raster, a print module 30 prints the raster to paper (or other suitable media).

Thus, the conversion of PDF to PostScript is accelerated by parallelizing the process. Since the input PDF is read-only and page independent, the conversion of a PDF document can be subdivided (i.e., pages can be chunked or grouped) and the work can be queued for multiple worker threads/processes that can process in parallel. The resulting PostScript can be reassembled for further processing by the larger pipeline. In this regard processing can be performed in pipeline mode (i.e., continuously) or in batch mode (i.e., wherein batches of processing are performed periodically such that processing is continued once all batches in a set of batches are complete).

It will be appreciated that the systems and methods described herein can be implemented by a computer (not shown), which comprises one or more processors (such as the processor(s) (12) that executes, and a memory (such as the memory 14) that stores, computer-executable instructions for providing the various functions, etc., described herein.

The computer can be employed as one possible hardware configuration to support the systems and methods described herein. It is to be appreciated that although a standalone architecture is illustrated, that any suitable computing environment can be employed in accordance with the present embodiments. For example, computing architectures including, but not limited to, stand alone, multiprocessor, distributed, client/server, minicomputer, mainframe, supercomputer, digital and analog can be employed in accordance with the present embodiment.

The computer can include one or more processing units 12, a system memory 14, and a system bus (not shown) that couples various system components including the system memory to the processing unit. The processing unit can be any of various commercially available processors. Multiple microprocessors and/or multi-core processor architectures also can be used as the processing unit.

The computer typically includes at least some form of computer readable media. Computer readable media can be any available media that can be accessed by the computer. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

A user may enter commands and information into the computer through an input device (not shown) such as a keyboard, a pointing device, such as a mouse, stylus, voice input, or graphical tablet. The computer can operate in a networked environment using logical and/or physical connections to one or more remote computers, such as a remote computer(s). The logical connections depicted include a local area network (LAN) and a wide area network (WAN). Such networking environments are commonplace in offices, enterprise-wide computer networks, intranets and the Internet.

Figure 2A:
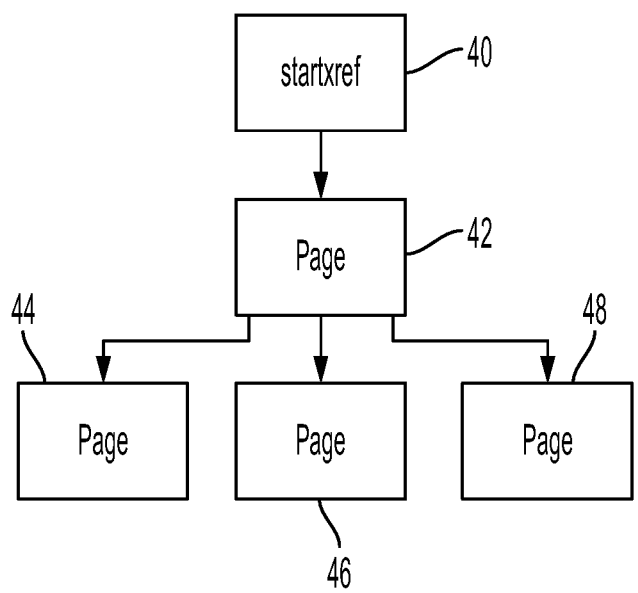
FIG. 2A illustrates an example of the hierarchical structure of PDF documents.
Figure 2B:
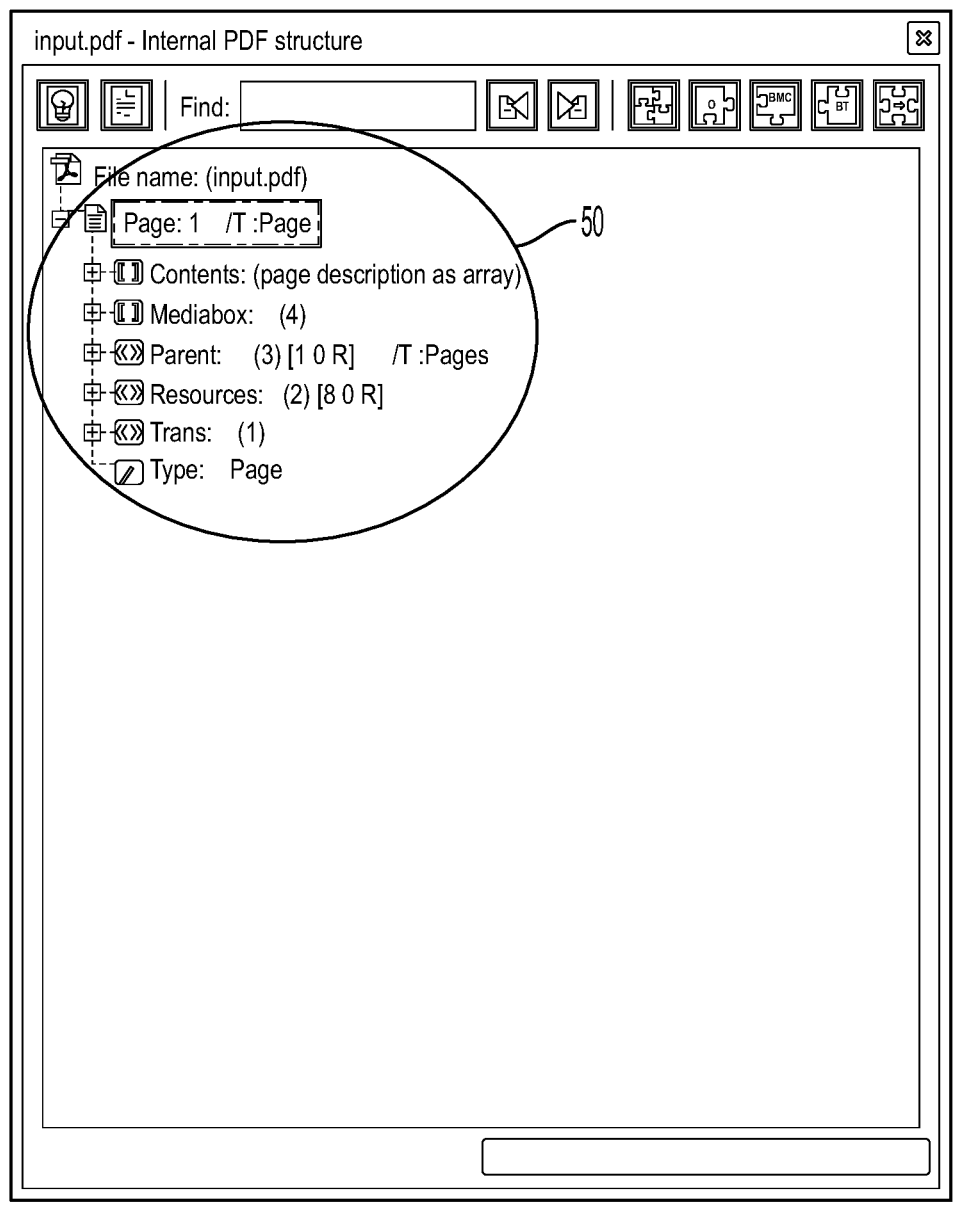
FIG. 2B shows a screenshot of an input PDF showing a hierarchical structure comprising pages are further parsed into resources.

Unlike PostScript, PDF files have a hierarchical structure that can be easily used to decompose the document. FIG. 2A illustrates an example of the hierarchical structure 40 of PDF documents. In the illustration of FIG. 2A, the document is described hierarchically with a table of object offsets 40 (e.g., startxref) included in PDF-to-PostScript blocks, a page definition level 42, and a plurality of pages 44, 46, 48 that can be grouped or chunked and then sent to different processors or threads for parallel conversion to PostScript. FIG. 2B shows a screenshot of an input PDF showing a hierarchical structure comprising pages (e.g., Page 1) that can be further parsed into resources 50 such as Contents, MediaBoxes, etc., as illustrated. The PDF document is read-only and each page may be offloaded onto a separate worker thread and/or process(or). In printing devices having multi-core CPUs, each thread runs on its own core, thereby speeding up the flattening of transparent objects.

Figure 3:
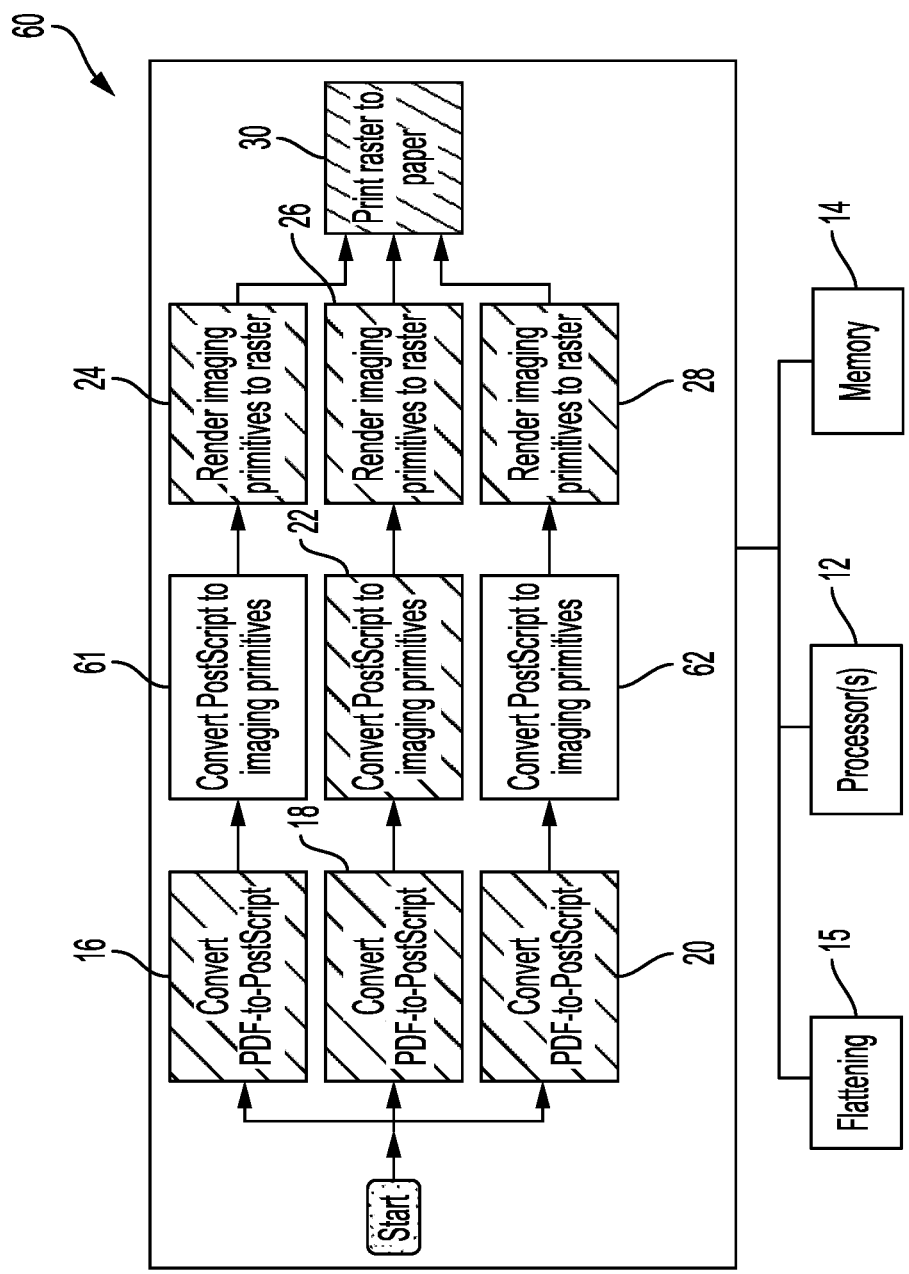
FIG. 3 illustrates a system comprising additional imaging primitive conversion modules, which facilitate parallelizing the PostScript-to-imaging primitives step.

FIG. 3 illustrates a system 60 similar to that of FIG. 1 but comprising additional imaging primitive conversion modules 61 and 62, which facilitate parallelizing the PostScript-to-imaging primitives step using one or more processors 12 and one or more memories 14 (e.g., computer-readable media) to contemporaneously convert PDF pages to Postscript pages, in accordance with one or more features described herein. PDF is a static representation of a printable document. Often, PDF documents include transparency effects (i.e., sections or regions of a document or page including objects that can be seen through or are not entirely opaque), which are difficult to convert into PostScript. To this end, the system 60 comprises a flattening module 15 that, when executed by the processor 12, collapses two (or more) overlaid transparent objects into a one or more non-transparent objects that can be processed using PostScript, which places markers on the media, into imaging primitives.

A received PDF document is chunked into groups, each group then being separately processed in parallel by a plurality of respective conversion modules 16, 18, 20 which convert the PDF pages in the chunk into Postscript pages while reducing processing time. While the flattening module 15 is illustrated as a separate component from the conversion modules 16, 18, 20, it will be appreciated that the flattening module may be integral to each conversion module 16, 18, 20, such that each conversion module is responsible for performing the herein-described flattening of transparent objects.

The flattening module 15 converts PDF objects with transparencies to PostScript objects. Once flattening is complete, the PDF pages can be converted to PostScript for image primitive generation.

In one embodiment, the processor 12 is further configured to identify pages with transparency objects and to generate batches or chunks of PDF pages that comprise an evenly distributed number of transparency objects. In another embodiment, document chunks that include a higher number of transparency objects relative to other chunks are routed to higher performance processors or threads for Post-script conversion.

A plurality of primitives conversion modules 22, 61, 62 receive the converted Postscript-formatted pages from the respective conversion modules 16, 18, 20, and convert the received PostScript pages to imaging primitives. The imaging primitives are received at a plurality of rendering modules 24, 26, 28, which render the imaging primitives to raster. Imaging primitives are lower-level commands that are executed in list order. Rendering to raster thus comprises executing the imaging primitives in list order. Once the imaging primitives have been rendered to raster, a print module 30 prints the raster to paper (or other suitable media). In another embodiment, the processor is configured to perform a soft proof on the raster.

According to an example, a PDF-to-PostScript conversion run on a performance test document having 14 pages takes 28 seconds to convert. Running the same a process on pages 1-7 and another on pages 8-14 at the same time (i.e., using parallel processing with flattening as described herein) takes 15.5 seconds, with the two processes both finishing in approximately $4/7$th of the single process time. Thus, by parallelizing this part of the printing pipeline (i.e., the PDF-to-PostScript conversion) and using the herein-described flattening technique to enable PostScript processing of transparent objects in the PDF document, device performance is improved.

The systems and methods described with regard to the preceding figures may be implemented in a computer program product that may be executed on a computer (not shown) or computing device (e.g., node, module, etc.) in the system of FIGS. 1 and 3. Further, it is to be appreciated that any suitable computing environment can be employed in accordance with the present embodiments. For example, computing architectures including, but not limited to, stand alone, multiprocessor, distributed, client/server, minicomputer, mainframe, supercomputer, digital and analog can be employed in accordance with the present embodiments.

The computer can include a processing unit such as the processor 12, a system memory such as the memory 14, and a system bus that couples various system components including the system memory to the processing unit. The processing unit can be any of various commercially available processors (e.g., a central processing unit, a graphical processing unit, etc.). Dual microprocessors and other multi-processor architectures also can be used as the processing unit.

The system bus can be any of several types of bus structure including a memory bus or memory controller, a peripheral bus, and a local bus using any of a variety of commercially available bus architectures. The computer memory includes read only memory (ROM) and random access memory (RAM). A basic input/output system (BIOS), containing the basic routines that help to transfer information between elements within the computer, such as during start-up, is stored in ROM.

The computer can further include a hard disk drive, a magnetic disk drive, e.g., to read from or write to a removable disk, and an optical disk drive, e.g., for reading a CD-ROM disk or to read from or write to other optical media. The computer typically includes at least some form of computer readable media. Computer readable media can be any available media that can be accessed by the computer. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other magnetic storage devices, or any other medium which can be used to store the desired information and which can be accessed by the computer.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above can also be included within the scope of computer readable media.

A number of program modules may be stored in the drives and RAM, including an operating system, one or more application programs, other program modules, and program non-interrupt data. The operating system in the computer can be any of a number of commercially available operating systems.

A user may enter commands and information into the computer through a keyboard (not shown) and a pointing device or stylus (not shown), such as a mouse. Other input devices (not shown) may include a microphone, an IR remote control, a joystick, a game pad, a satellite dish, a scanner, or the like. These and other input devices are often connected to the processing unit through a serial port interface (not shown) that is coupled to the system bus, but may be connected by other interfaces, such as a parallel port, a game port, a universal serial bus (USB), an IR interface, etc.

A monitor (not shown), or other type of display device, may also be connected to the system bus via an interface, such as a video adapter (not shown). In addition to the monitor, a computer typically includes other peripheral output devices (not shown), such as speakers, printers etc. The monitor can be employed with the computer to present data that is electronically received from one or more disparate sources. For example, the monitor can be an LCD, plasma, CRT, etc. type that presents data electronically. Alternatively or in addition, the monitor can display received data in a hard copy format such as a printer, facsimile, plotter etc. The monitor can present data in any color and can receive data from the computer via any wireless or hard wire protocol and/or standard.

The computer can operate in a networked environment using logical and/or physical connections to one or more remote computers, such as a remote computer(s). The remote computer(s) can be a workstation, a server computer, a router, a personal computer, microprocessor based entertainment appliance, a peer device or other common network node, and typically includes many or all of the elements described relative to the computer. The logical connections depicted include a local area network (LAN) and a wide area network (WAN). Such networking environments are commonplace in offices, enterprise-wide computer networks, intranets and the Internet.

When used in a LAN networking environment, the computer is connected to the local network through a network interface or adapter. When used in a WAN networking environment, the computer typically includes a modem, or is connected to a communications server on the LAN, or has other means for establishing communications over the WAN, such as the Internet. In a networked environment, program modules depicted relative to the computer, or portions thereof, may be stored in the remote memory storage device. It will be appreciated that network connections described herein are exemplary and other means of establishing a communications link between the computers may be used.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The exemplary embodiments have been described. Obviously, modifications and alterations will occur to others upon reading and understanding the preceding detailed description. It is intended that the exemplary embodiments be construed as including all such modifications and alterations insofar as they come within the scope of the appended claims or the equivalents thereof.

The invention claimed is:

1. A method for flattening transparent objects during page parallel processing of a PDF document, comprising:
   receiving a PDF document;
   identifying transparent objects in pages of the PDF document;
   chunking pages of a received PDF document into subgroups as a function of identified transparent objects on respective pages;
   converting in parallel each subgroup of PDF pages to PostScript format;
   converting Postscript pages into imaging primitives;
   in parallel, rendering subgroups of imaging primitives to raster; and
   distributing subgroups having at least one identified transparent object to at least one processor or thread having a higher performance than at least one other processor or thread used to process at least one subgroup that does not have a transparent object.

2. The method according to claim 1, further comprising flattening identified transparent objects by collapsing at least two overlaid transparent objects into one or more non-transparent objects.

3. The method according to claim 1, further comprising recombining pages in order and at least one of:
   executing a soft proof of the raster; and
   printing the raster on a printable medium.

4. The method according to claim 1, further comprising performing the page parallel processing in batch mode.

5. The method according to claim 1, further comprising performing the page parallel processing in pipeline mode.

6. The method according to claim 1, further comprising distributing pages having identified transparent objects substantially equally among processors or threads.

7. A system that facilitates flattening transparent objects during page parallel processing of a PDF document, comprising:
   one or more processors configured to:
      receive a PDF document;
      identify transparent objects in pages of the PDF document;
      chunk pages of a received PDF document into subgroups as a function of identified transparent objects on respective pages;
      convert in parallel each subgroup of PDF pages to PostScript format;
      convert Postscript pages into imaging primitives;
      in parallel, render subgroups of imaging primitives to raster; and
      distribute subgroups having at least one identified transparent object to at least one processor or thread having a higher performance than at least one other processor or thread used to process at least one subgroup that does not have a transparent object.

8. The system according to claim 7, wherein the one or more processors is further configured to flatten identified transparent objects by collapsing at least two overlaid transparent objects into a one or more non-transparent objects.

9. The system according to claim 7, wherein the one or more processors is further configured to recombine pages in order and at least one of:
execute a soft proof of the raster; and
print the raster on a printable medium.

10. The system according to claim 7, wherein the one or more processors is further configured to perform the page parallel processing in batch mode.

11. The system according to claim 7, wherein the one or more processors is further configured to perform the page parallel processing in pipeline mode.

12. The system according to claim 7, wherein the one or more processors is further configured to distribute pages having identified transparent objects substantially equally among processors or threads.

13. One or more processors configured execute computer-readable instructions for flattening transparent objects during page parallel processing of a PDF document, the one or more processors being configured to:
receive a PDF document;
determining whether transparent objects are present in the received PDF document;
chunk pages of a received PDF document into subgroups as a function of identified transparent objects on respective pages;
convert in parallel each subgroup of PDF pages to PostScript format;
convert Postscript pages into imaging primitives;
in parallel, render subgroups of imaging primitives to raster; and
distribute subgroups having at least one identified transparent object to at least one processor or thread having a higher performance than at least one other processor or thread used to process at least one subgroup that does not have a transparent object.

14. The one or more processors according to claim 13, further configured to flatten identified transparent objects by collapsing at least two overlaid transparent objects into one or more non-transparent objects.

15. The one or more processors according to claim 13, further configured to recombine pages in order and at least one of:
execute a soft proof of the raster; and
print the raster on a printable medium.

16. The one or more processors according to claim 13, further configured to perform the page parallel processing in batch mode.

17. The one or more processors according to claim 13, further configured to perform the page parallel processing in pipeline mode.

18. The one or more processors according to claim 13, further configured to distribute pages having identified transparent objects substantially equally among processors or threads.

19. The one or more processors according to claim 13, wherein one or more pages in the received document do not include transparent objects.

* * * * *